(No Model.)
R. HOFFMAN.
PNEUMATIC TIRE.
No. 520,643. Patented May 29, 1894.
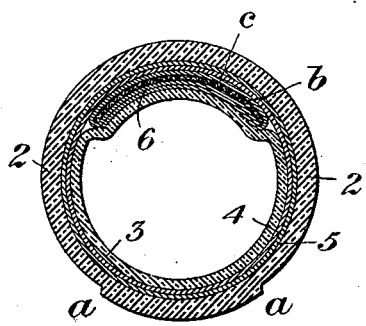
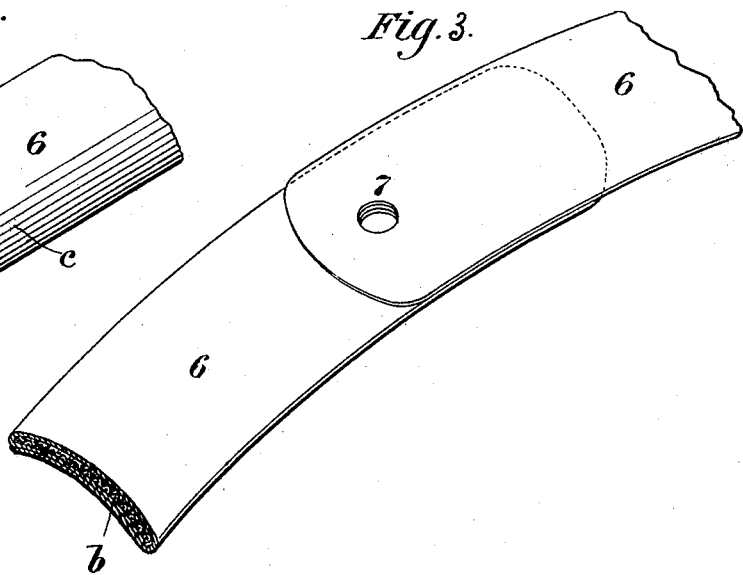
WITNESSES
INVENTOR
Robert Hoffman
by his attorneys
W. Bakewell & Sons.

UNITED STATES PATENT OFFICE.

ROBERT HOFFMAN, OF PITTSBURG, PENNSYLVANIA.

PNEUMATIC TIRE.

SPECIFICATION forming part of Letters Patent No. 520,643, dated May 29, 1894.

Application filed October 20, 1893. Serial No. 488,709. (No model.)

*To all whom it may concern:*

Be it known that I, ROBERT HOFFMAN, of Pittsburg, in the county of Allegheny and State of Pennsylvania, have invented a new and useful Improvement in Pneumatic Tires, of which the following is a full, clear, and exact description.

In the accompanying drawings, forming part of this specification, Figure 1 shows my improved tire in vertical cross-section. Fig. 2 is a detail view, showing the manner of incasing the protecting strip in canvas or cloth. Fig. 3 is a detail view showing the manner in which the ends of the protecting strip of Fig. 1 are lapped within the tire.

Like symbols of reference indicate like parts in each of the views.

The object of my invention is to provide a protecting strip for pneumatic tires for bicycles and other vehicles which shall be tough and durable and not liable to be punctured in accidentally running over glass, nails and like sharp objects.

In the drawings, 2 represents the outer rubber shell of a pneumatic tire; *a a* is the portion of its inner circumference adapted to be attached to the felly of the wheel.

3 is the inner removable air tube, and 6 is my improved removable protecting strip, set in the interior of the tire between the shell 2 and the inner tube 3. The protecting strip is composed of close-mesh woven wire fabric *b* incased in and cemented to a sheathing *c* of canvas or like material, which is wrapped one or more times around it. This constitutes a strong and difficultly penetrable strip, for the cement adheres firmly to the canvas on both sides of the wire cloth and fills the interstices of the fabric, and the canvas sheathing together with the cement affords a firm bond for the wires, keeps them from spreading if the outer shell should be pierced by a sharp point, and prevents them from cutting or tearing the rubber of the tire and tube. The layers of canvas and wire cloth so cemented, form in fact a solid compound strip. The strip curves laterally so as to conform to the curvature of the wheel, and extends entirely around the periphery of the tire, its ends preferably overlapping. The ends of the strip, as shown, are unattached, a hole 7 being made in one of the ends for attachment of a cord by which it may be drawn through the hollow outer shell of the tire. The ends of the strip are intended to overlap when in use and the strip may be made long enough to fit several sizes of wheels, the surplus length being taken up in the lap.

In applying the strip to use, it is inserted into the outer shell by the same means as are used for inserting the inner air tubes, the air tube 3 is then inserted on the inner side of the strip, and when it is inflated as shown in Fig. 1, it presses the strip outwardly against the outer shell opposite to the exterior wearing surface thereof, and holds it securely in place. Both the inner tube and the protecting strip may then be removed when desired, and as the use of the strip requires no modification in the construction of the other parts, it may be applied readily to any of the common forms of removable air tube tires now in use. I have found that the use of this protecting sheathing effectually prevents puncturing the tire, for if any tacks or other pointed articles should enter the outer shell, they will not pierce the protecting sheathing, and the resiliency of the latter is such that it does not impair the operation of the tire.

I am aware of prior patents in which wire fabric has been used as a protection to pneumatic tires, and I do not therefore claim broadly the use of wire fabric for this purpose.

What I desire to secure by Letters Patent is—

As a new article of manufacture a protecting strip adapted to be interposed between the inner and outer tubes of a pneumatic tire with its ends overlapping, said strip consisting of a strip of woven wire fabric and a covering of canvas, the canvas on opposite sides of the strip being united together and to the wire fabric by cement, said cement filling the interstices of the wire fabric, whereby is formed a solid compound strip, substantially as described and for the purpose set forth.

In testimony whereof I have hereunto set my hand.

ROBERT HOFFMAN.

Witnesses:
W. B. CORWIN,
H. M. CORWIN.